United States Patent Office 2,768,935
Patented Oct. 30, 1956

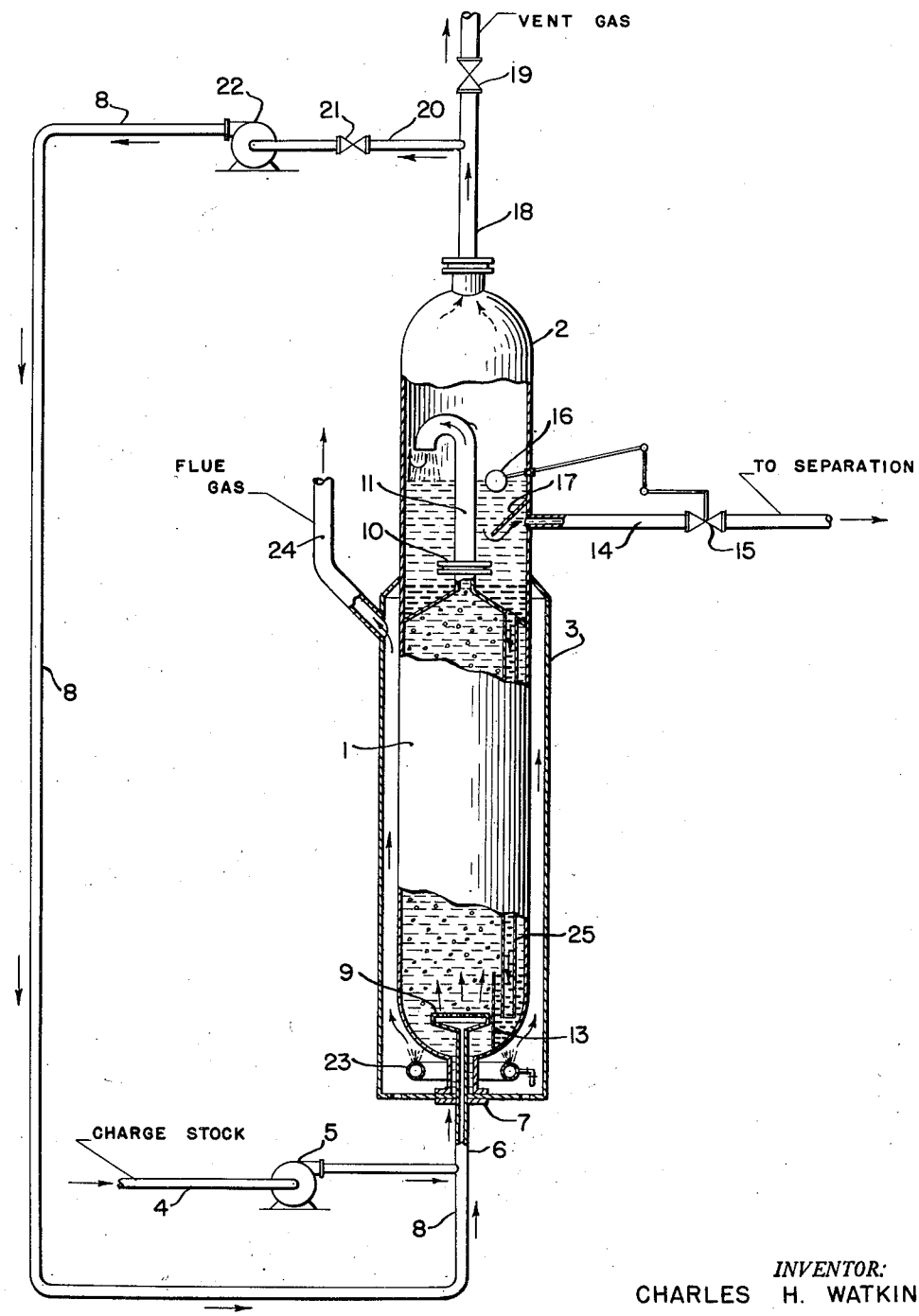

2,768,935

PROCESS AND APPARATUS FOR THE CONVERSION OF HYDROCARBONACEOUS SUBSTANCES IN A MOLTEN MEDIUM

Charles H. Watkins, Western Springs, Ill., assignor to Universal Oil Products Company, Chicago, Ill., a corporation of Delaware Application June 11, 1952, Serial No. 292,967

4 Claims. (Cl. 196—52)

This invention relates to a process and apparatus for the conversion of hydrocarbonaceous substances in a molten, catalytic or non-catalytic carrying medium.

In particular this invention relates to a continuous non-regenerative process and apparatus for the conversion of hydrocarbonaceous substances in which a molten salt medium is used as a catalyst, carrying medium, or direct heat transfer medium.

The present invention can best be described in relation to a hydrocracking operation. The catalytic processes generally in use comprise contacting the hydrocarbon to be cracked with a solid granular catalyst at cracking conditions where the catalyst is either in a fixed bed or in a moving or fluidized bed. The conversion reactions are characterized by the formation of a carbonaceous material called coke which deposits on the catalyst, covering the active catalytic surfaces and rendering the catalyst inactive. The catalyst cannot be used to promote further reactions until it is regenerated by removing the coke formation by burning it therefrom. Regeneration is accomplished either by interrupting the hydrocarbon feed to the catalyst bed and subsequently contacting the catalyst with oxygen-containing gas in the case of fixed bed operations; or by causing the catalyst to continuously flow in a cycle between the reaction zone where it is contacted with hydrocarbon and a regenerating zone where it is contacted with oxygen-containing gas.

Catalytic conversion processes using solid granular catalysts have many inherent undesirable characteristics. Regeneration of catalyst is a costly operation in that it requires a great deal of additional equipment and an additional reactant, namely the regenerating gas. The catalyst activity steadily declines due to high regeneration temperatures and exposure to stripping steam, necessitating periodical removal, discarding and replacing with fresh catalyst. The catalyst losses are high due to the difficulty of separating the fluidized catalyst from the reaction products and the flow of hard solid particles causes erosion of equipment and costly maintenance of mechanical devices.

The present invention provides for a process and an apparatus that eliminate all of the above mentioned operational difficulties and provides a continuous non-regenerative process of converting hydrocarbonaceous substances. It is an object of this invention to provide a process for catalytically converting hydrocarbonaceous substances by contacting the hydrocarbonaceous substances with a molten salt catalyst under suitable conditions of temperature and pressure and in the presence of a hydrogen-containing gas, separating the resulting gaseous and liquid reaction products from the molten salt catalyst, returning the molten salt catalyst to the reaction zone, passing the liquid reaction products to a fractionation zone and returning the gaseous reaction products to be commingled with the hydrocarbonaceous substances charged. It is a further object of the present invention to provide an apparatus in which the above mentioned process may be effected.

In one embodiment the present invention deals with a process wherein the hydrocarbonaceous substance to be converted, hereinafter called the charge stock, is commingled with a hydrogen-containing gas, the source of which to be subsequently described, and introducing the resulting mixture through a distributing device into a reaction zone which contains a molten salt catalyst. The mixture of charge stock and hydrogen-containing gas form a suspension with the molten salt catalyst and the resultant suspension passes upwardly through the reaction zone and discharges therefrom through a vertical confined path and into an adjacent separating zone, the conversion reaction occurring while the suspension is in transit through the reaction zone. In the separating zone there is maintained a liquid level and the suspension separates into three phases, a gaseous phase, a liquid product phase, and a molten salt phase. The gaseous phase collects in the separation zone in the space above the liquid level and is discharged therefrom through a pressure control valve, partly as excess gas and partly as the before-mentioned hydrogen-containing gas that is commingled with the incoming charge stock. The molten salt phase which is the densest, and thus the bottom-most phase, is discharged from the separation zone downwardly through a confined path into the lower section of the reaction zone where it again is commingled with the incoming charge stock. The liquid product phase discharges from the center section of the separation zone and passes to fractionation and storage.

The apparatus of the present invention can best be described with reference to the drawing, which shows diagrammatically one embodiment of apparatus providing for the contacting and separation of the charge stock with a molten salt catalyst. The apparatus consists of a vertical vessel consisting of an upper chamber 2 and a lower chamber 1. The lower chamber 1, hereinafter called the reaction chamber, is provided with a flange 7 in the lower section through which passes a conduit 6 provided with distributing nozzle 9 that opens in the lower section of the reaction chamber. Charge stock to the unit enters line 6 by passing through line 4 and pump 5 and in line 6 the charge stock is commingled with hydrogen-containing recycle gas entering from line 8. The upper section of reaction chamber 1 is provided with an open ended vertical conduit 11, the lower opening of the conduit being in the upper section of chamber 1 and the upper end of the conduit being in the central section of chamber 2 hereinafter called the separating chamber. The separating chamber 2 is provided with an open ended conduit or return pipe 25 whose upper opening is in the lower section of the separating chamber 2 and whose lower opening is in the lower section of the reaction chamber 1. Baffle 13 in the lower section of chamber 1 prevents the incoming charge stock from entering line 25. The separating chamber 2 is further provided with a liquid product discharge conduit 14 and control valve 15, opening in the central section of chamber 2. A baffle 17 shields the opening to conduit 14 so that liquid passing from chamber 2 through conduit 14 must reverse direction as it flows around baffle 17, thus eliminating the possibility of a mixed phase fluid discharging through line 14. Chamber 2 is further provided with a liquid level controlling device 16 which actuates valve 15 thereby maintaining a constant volume for the gas phase and further preventing the escape of gases through line 14.

Chamber 2 is further provided with a gaseous discharge line 18 and control valve 19 through which excess gas is discharged from the system. Recycle gas line 20, with control valve 21, connects to line 18 and provides means to transport a portion of the reactant gas back to the reaction zone wherein it is commingled with incoming charge stock. Compressor 22 is provided in line 20. The reaction vessel 1 is encased in a chamber 3 so that chamber 3 is coaxial to chamber 1 thereby forming an annular space between the outer wall of chamber 1 and the inner wall of chamber 3. A ring burner 23 is provided in the lower section of the annular space so that the hot flue gases resulting from the burning of fuel in said ring burner rise through the annular space thereby heating vessel 1 and discharging through vent 24. Chamber 3 may be provided with insulation so that heat losses will be reduced. When operating at steady state conditions, an exothermic reaction may be self-sustaining as far as heat is concerned and, therefore, ring burner 23 may be turned off. If excess heat must be dissipated, air may be circulated in the annular space between chamber 1 and chamber 3 to cool the reaction zone.

In a cracking operation the apparatus and process herein described may be operated at temperatures in the range of from about 500° to about 2000° F. and at pressures from atmospheric to about 5000 p. s. i. or more. The apparatus herein described can accommodate a variety of charge stocks including light hydrocarbon gases, straight-run or natural gasolines, naphthas, gas oils, heavy oils, asphaltic residues, coal pastes, oil shales, etc.

In a preferred embodiment the cracking process is effected at conditions of temperature and pressure selected to cause gasoline, i. e. material boiling below 400° F., to be in the gaseous phase in the reaction zone and heavier material to be in the liquid phase. By operating in this manner a higher degree of selectivity may be obtained in that the gasoline formed escapes from the reaction zone as a vapor before further cracking is effected while heavier material is subjected to longer exposure to the catalyst at cracking conditions.

The process and apparatus described herein are especially useful for promoting cracking reactions, but their use is not limited to this process. By varying reaction conditions, feed composition and by selecting the proper molten salt catalyst other conversions may be effected including (1) treatment of gasoline to improve its antiknock properties in processes known as reforming, isoforming retreating, etc. (2) alkyl transfer, as for example, the reaction of xylene and benzene to form toluene, etc., (3) alkylation of aromatic or paraffinic hydrocarbons with olefinic hydrocarbons, alcohols, esters, etc., (4) polymerization of unsaturated hydrocarbons to form higher boiling hydrocarbons, (5) coking of hydrocarbons to form gasoline, cycle oils, olefinic gases and hydrocarbonaceous coke, (6) treatment of petroleum fractions to remove undesirable contaminants, as for example, the desulfurization of gasoline, etc.

The apparatus as herein described may be slightly altered and still be within the scope of this invention as, for example, when carrying on a coking operation a separating screen may be provided either in the separating chamber or at some exterior point in the discharge line. Ordinarily the coke formed will wash out with the liquid product so that the catalyst will be maintained with an equilibrium quantity of coke suspended therein. However, in the event that coking proceeds to an extreme degree, it is within the scope of this invention to place a screening or filtering device in the separating section so that the coke formed in the process is removed from the catalyst before the catalyst is returned to the reaction zone. Other modifications may include a different means for supplying heat to the annular zone around chamber 1 or the use of a cooling device in the upper section of the separating zone 2 so that only normally gaseous hydrocarbons go overhead. Also, instead of a 180° bend in the conduit 11 connecting the reaction zone to the separating zone any suitable device can be used to prevent the stream from dispersing in the gaseous phase, such as deflection plates or other suitable baffles.

Further modifications may include a means for commingling a suitable oxygen-containing gas with the catalyst in the reaction zone or in a separate contacting zone thereby oxidizing the coke suspension and supplying the necessary endothermic heat of reaction and at the same time maintaining the purity of the catalyst. Provisions may also be made for filtering the catalyst or otherwise removing any impurities that may accumulate in the course of operation.

I claim as my invention:

1. A conversion process which comprises maintaining a continuous, vertically elongated body of molten catalyst in a reaction zone, introducing a hydrocarbonaceous material into the lower portion of said body and forming a suspension thereof with molten catalyst, passing said suspension upwardly through the reaction zone and then into a separating zone, separating in the last-named zone a gaseous phase, a liquid hydrocarbon phase and a molten catalyst phase, and passing molten catalyst downwardly by gravity from the separating zone to the lower portion of the reaction zone in a confined path extending vertically through said body of molten catalyst.

2. The process of claim 1 further characterized in that said hydrocarbonaceous material is a petroleum fraction boiling above 400° F.

3. The process of claim 1 further characterized in that said conversion is a cracking process wherein a heavy hydrocarbon oil is contacted with said molten catalyst at a temperature in the range of from about 500° F. to about 2000° F. and at a pressure of from atmospheric to about 5000 p. s. i.

4. A unitary apparatus comprising in combination a vertical elongated vessel divided into upper and lower chambers, said lower chamber having an inlet conduit projecting into the lower section thereof and terminating in a distributing nozzle, a vertical open-ended discharge conduit having a lower opening in the upper section of said lower chamber and an upper opening terminating in the intermediate section of said upper chamber, the upper end of said vertical conduit bending 180° so that said conduit discharges downwardly into said intermediate section of said upper chamber, a second open-ended vertical conduit having an upper opening in the lower section of said upper chamber and a lower opening in the lower section of said lower chamber, a liquid discharge conduit connecting with the intermediate section of said upper chamber, a baffle extending from the upper chamber wall downwardly at an angle whereby the horizontal projection of said baffle is superimposed over the opening to said discharge conduit, a gaseous discharge line extending from the upper section of said upper chamber, said discharge line having a pressure control valve and a recycle gas tap off line, conduit means connecting said recycle gas tap off line to said lower chamber inlet line, a valve in said liquid discharge conduit, a liquid level control device attached to said upper chamber suitable to actuate said valve in said liquid discharge line in response to fluctuations in the level of a liquid maintained in said upper chamber, an outer housing coaxial to and surrounding said lower chamber providing an annular heating section between said chambers, a burner disposed in the lower portion of said annular section and a vent line provided from the upper section of said outer housing and said annular section.

References Cited in the file of this patent

UNITED STATES PATENTS

| 1,620,075 | Clancy | Mar. 8, 1927 |
| 1,658,116 | Clancy | Feb. 7, 1928 |
| 2,269,485 | Salmi | Jan. 13, 1942 |
| 2,334,583 | Reeves | Nov. 16, 1943 |
| 2,354,354 | Abrams | July 25, 1944 |
| 2,398,213 | Dutson et al. | Apr. 9, 1946 |
| 2,509,751 | Watson | May 30, 1950 |
| 2,581,670 | Kassel | Jan. 8, 1952 |